United States Patent [19]

Severinsky

[11] Patent Number: 5,241,217

[45] Date of Patent: Aug. 31, 1993

[54] UPS WITH INPUT COMMUTATION BETWEEN AC AND DC SOURCES OF POWER

[75] Inventor: Alex J. Severinsky, Silver Spring, Md.

[73] Assignee: Premier Power, Inc., McLean, Va.

[21] Appl. No.: 788,947

[22] Filed: Nov. 7, 1991

[51] Int. Cl.[5] .................................................. H02J 9/00
[52] U.S. Cl. ........................................ 307/64; 307/75; 363/34; 363/37; 363/142
[58] Field of Search ................ 307/64, 66, 72, 73, 307/75; 363/34, 37, 142

[56] References Cited

U.S. PATENT DOCUMENTS

| | | | |
|---|---|---|---|
| 3,323,005 | 5/1967 | Ladoniczki et al. | 307/75 |
| 4,185,315 | 1/1980 | Miller | 307/72 |
| 4,253,139 | 2/1981 | Weiss | 363/37 |
| 4,277,692 | 7/1981 | Small | 307/66 |
| 4,409,647 | 10/1983 | Terkanian | 363/37 |
| 4,779,007 | 10/1988 | Schlanger et al. | 307/66 |
| 4,827,150 | 5/1989 | Reynal | 307/66 |
| 4,935,861 | 6/1990 | Johnson et al. | 363/37 |
| 5,017,800 | 5/1991 | Divan | 363/37 |

Primary Examiner—J. L. Sterrett
Attorney, Agent, or Firm—Banner, Birch, et al.

[57] ABSTRACT

An uninterruptible power supply is disclosed which is cheaper and more adaptable to various utility service inputs than presently available power supplies. A storage capacitor is placed between a boost AC/DC converter at the input and a DC/AC inverter at the output. A storage battery for maintaining constant voltage should the utility service power be interrupted is placed at the input, before the boost converter. Thus, a small battery is required because the boost converter is capable of boosting the battery's voltage to the voltage contained on the storage capacitor. A bidirectional semiconductor switch is provided in the boost converter to allow current to flow in both directions between its switch terminals when a AC input is applied. Appropriate control circuitry is provided which monitors the voltage at specific points throughout the circuit and controls operation of the bidirectional switch. Additionally, the control circuitry controls operation of a relay to switch power input between the utility service input and the storage battery depending in part upon the state of the utility service input voltage.

10 Claims, 4 Drawing Sheets

UPS WITH INPUT COMMUTATION BETWEEN AC AND DC SOURCES OF POWER

BACKGROUND OF THE INVENTION

This invention relates to the field of Uninterruptible Power Supplies (UPS) powered primarily from electric utility alternating current (AC) power and providing controlled AC power at their output. UPS usually contain internal electrical storage batteries storing direct current (DC) power, which are used during interruptions of utility power flow. This invention describes a novel way of connecting a battery in UPS circuits.

Five patents relate to the present invention. Each is described separately below.

U.S. Pat. No. 5,017,800 to Divan describes a UPS which has an input converter feeding an electrical storage DC capacitor, an inverter powered from this capacitor, and a battery connected in parallel with the DC storage capacitor. This reference describes classical UPS topology. Some of the disadvantages of this circuit are as follows. The battery is selected on an economic basis depending upon the amount of desired reserve time at a given power level. The DC voltage of this battery is usually much smaller than the DC voltage on the capacitors. The battery can not be connected in parallel with the capacitors because a high voltage on the capacitors will either damage or destroy the battery. Therefore, Divan uses a DC-DC boost converter to boost the battery voltage to the level of voltage on the capacitors. See FIG. 6 of this patent. This circuit increases the cost of the UPS because it adds this boost converter which is used only on an emergency basis when the utility power fails.

U.S. Pat. No. 4,935,861 to Johnson et al. describes another UPS with fewer advantages than Divan. Johnson also uses classical UPS topology with the battery connected to DC capacitors located between a rectifier and an inverter. In this invention, two DC capacitors are used, each in a half wave rectifier. Then again, a boost DC-DC converter is used to boost the battery voltage to the voltage level on the capacitors, e.g., from 12 V to 170 V. But because there are two capacitors with different voltage polarities and common connections to the battery, a boost converter is used to boost voltage to one capacitor in the same polarity as the battery voltage, and use of a transformer with an inverted polarity to the other capacitor. This converter is even more disadvantageous because it is more complex than Divan's, i.e., has more parts including a half power transformer, and therefore is even more expensive.

U.S. Pat. No. 4,827,150 to Reynal describes another UPS with classical topology. Again, a battery is connected to capacitors via a boost converter.

U.S. Pat. No. 4,779,007 to Schlanger et al. describes a different UPS topology. In this UPS, power to an inverter is delivered via a switch between DC power on the output of a rectifier and DC power on the output of an "up converter", i.e., a boost DC-DC converter. This topology does not eliminate the disadvantages of having a boost converter to boost the battery voltage to the level produced by an AC rectifier. Therefore, this invention retains the cost disadvantage of having full power converter which is rarely used.

U.S. Pat. No. 4,277,692 to Small describes an alternate UPS topology. In Small, power flows from the utility AC source to the load via a switch. A bidirectional power converter is located in parallel with the load. When utility power is present, this converter converts AC into DC and charges the battery. When utility power fails, the switch connecting this power to the load opens and the converter inverts DC power from the battery to an AC power to the load. However, this topology has major performance disadvantages over the topologies described above. Other topologies, called "On-Line UPS", use an inverter to provide power to the load at all times. Because the inverter operation is totally internally controlled, it provides controlled regulated power to the load. In the "Stand-By" topology described by the Small patent, when the utility power fails, the switch requires a finite time to turn off and reverse power flow in the bidirectional converter. During this interval, there is no power flow to a load. This time is typically larger than 4-6 millisecond, which is large in comparison with a half cycle of utility power (8.3 to 10 milliseconds). Numerous loads do not tolerate such long interruptions of power flow. Additionally, all waveform distortions shorter in duration than this switchover time propagate to the load, distortions such as spikes, oscillations, and EMI noise.

SUMMARY OF THE INVENTION

An object of the present invention is to overcome the disadvantages of the above described references and to make an On-Line UPS without the additional cost of a rarely used full power DC-DC converter which matches voltage on the batteries to the voltage on the capacitors located between the converter/rectifier and the inverter of an UPS.

It is a further object of the present invention to disconnect the utility power source from the UPS during utility power failure so as to eliminate the likelihood of the UPS feeding power back to the utility power source during intentional power disconnects, e.g., during servicing.

DETAILED DESCRIPTION OF THE PREFERRED EMBODIMENT

A description of the power circuits for the present invention is first described below. Second, an example of a bidirectional semiconductor switch for the present invention is described. Third, the preferred transfer control circuits for operating the bidirectional semiconductor switch and relay are described. Finally, the operation of the above four circuits is described in detail, with timing diagrams depicting this operation.

Figure 1:
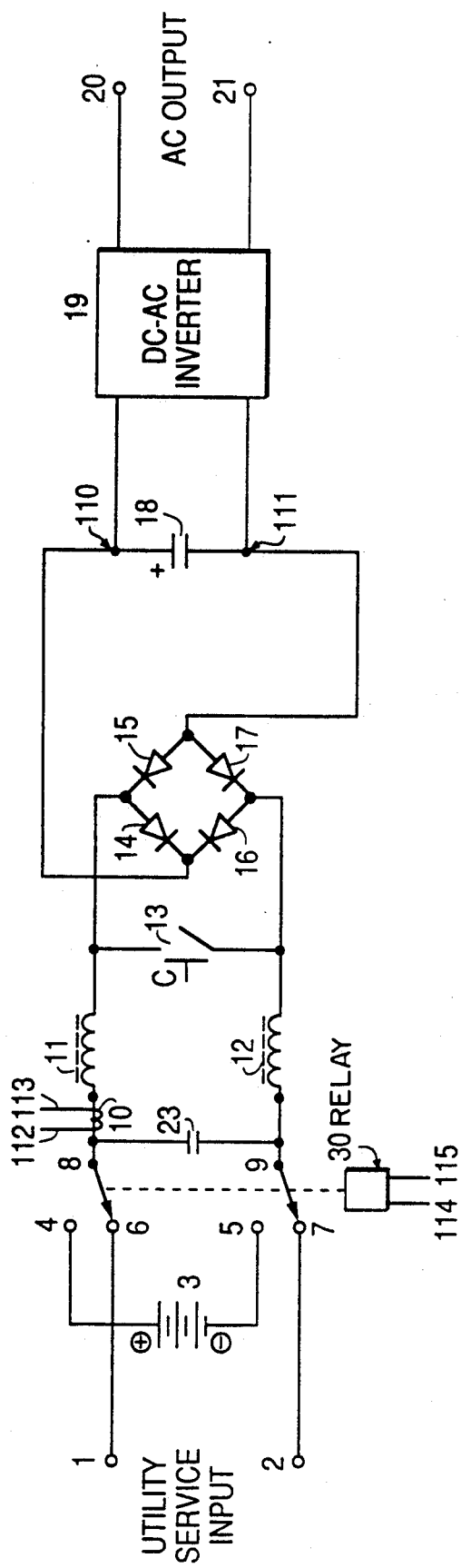
FIG. 1, shows the power circuits of an UPS with input commutation between AC and DC sources of power.

With reference to FIG. 1, utility alternating current (AC) power is input to terminals 1 and 2. Terminals 1 and 2 are connected to one set of input terminals of the dual pole double throw contacts of relay 30, relay terminals 6 and 7.

Electric storage battery 3, a direct current (DC) source of power, is connected to the second set of input terminals of relay 30, terminals 8 and 9. The polarity of the connection is irrelevant.

Output load terminals 8 and 9 of relay 30 are connected to the bipolar boost converter 25, which consists of chokes 11 and 12, bidirectional semiconductor switch 13, a diode bridge consisting of diodes 14–17, and storage capacitor 18. Input of choke 11 is connected to terminal 8 and input of choke 12 is connected to terminal 9. The outputs of both chokes are connected to switch 13. The diodes in the full wave rectifier bridge, 14–17, are connected between each other as in the well known full wave rectifier bridge circuit. The input AC side of the bridge is connected in parallel with switch 13, the output DC side of the bridge is connected to the output storage capacitor 18.

Many other circuits perform the same function as the preferred boost converter described above. First, this converter can be built with only one choke 11 or 13. Second, the choke(s) and switch can be placed on the output of the bridge with an additional diode in traditional DC to DC boost circuit topology, well known in the art.

A current measuring device, preferably current transformer 10, measures current from the load terminal 8 of the relay 30 to the choke 11. This device may also be connected to terminal 9.

An input filter capacitor 23 is connected across terminals 8 and 9 for a purpose described below.

Power from storage capacitor 18 is fed into DC to AC inverter 19 which has its AC output connected to output terminals 20 and 21. DC-AC inverter 19 includes power conversion circuits and control circuits. Numerous inverter circuits are well-known in the prior art.

Figure 2:
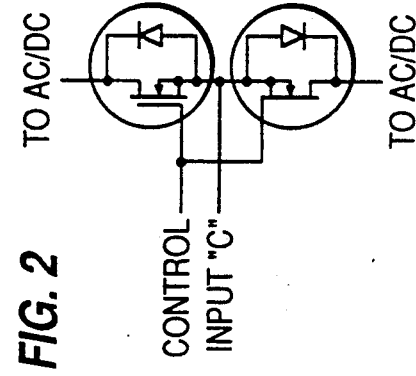
FIG. 2 shows an example of a bidirectional power semiconductor switch.

A number of circuits are known which act as bidirectional semiconductor switches; an example of one is depicted in FIG. 2. The term "bidirectional" means that the switch turns on and off to allow current to flow in both directions between the switch terminals. The switch in FIG. 2 consists of two MOSFET power transistors 401 and 402 having a common "source" point. The "drain" terminals of both transistors are used as the input and output power terminals for the switch. The gates of both transistors are connected together and a control input voltage is applied between this common gate terminal and the common "source" terminal to activate the switch. "Body diodes" 403 and 404 are inherent in transistors and are shown connected in parallel with transistors 401 and 402 respectively.

Three voltage level conditioners 200–202 function to reduce the power circuit input voltage down and to shift its level if necessary so that common integrated circuits can be used to operate at the lowered voltages. Voltage conditioner 200 has its input terminals connected to utility input terminals 1 and 2; voltage conditioner 201 has its input terminals connected to converter input terminals 8 and 9; voltage conditioner 202 has its input terminals connected to terminals 110 and of DC storage capacitor 18.

The input of current to voltage converter 203 is connected to current measuring device 10 through terminals 112 and 113. Converter 203 functions to provide voltage at its output proportional to current from terminal 8 of the relay 30, and with an amplitude compatible with common integrated circuits.

The outputs of circuits 200–203 are fed to comparators 204–207. The other inputs of comparators 204–207 are fed with a reference voltage which may have different values for each comparator. Comparators 200–203 provide digital output, logic levels either high or low. This output changes polarity when the compared input voltage difference changes polarity. Comparator circuits are well-known in the prior art.

Outputs of comparators are fed into digital logic sequencing circuit 210. The outputs of sequencer 210 set and reset two memory elements 220 and 221. Flip-flops can be used as such memory elements 220 and 221. The output logic level of memory elements 220 and 221 are fed back to the sequencer 210 to indicate whether switch 13 or relay 30 are on or off.

Output signal (logic level) of memory element 220 turns on and off boost converter pulse width modulation (PWM) control circuit 222. PWM controller 222 has other inputs from terminals 8 and 9 from converter input and terminals 110 and 111 from converter output; and, if necessary, from current measuring device 10 via its output terminals 112 and 113. Numerous boost converter control circuits are well-known. The PWM output of controller 222 feeds control terminal of semiconductor switch 13.

Output logic level of memory element 221 turns on and off power to the relay coil 30 via relay coil driver 224. Outputs of driver 224 are connected to relay coil terminals 114 and 115.

When utility service voltage is within its predefined limits, relay 30 connects service power to boost converter 25. Converter 25 converts AC voltage to DC on capacitor 18 with a voltage larger than a predefined maximum peak voltage in the utility service. Then under any input voltage, power is always controlled by converter 25 and never flows uncontrolled through the rectifier bridge to capacitor 18.

Figure 3:
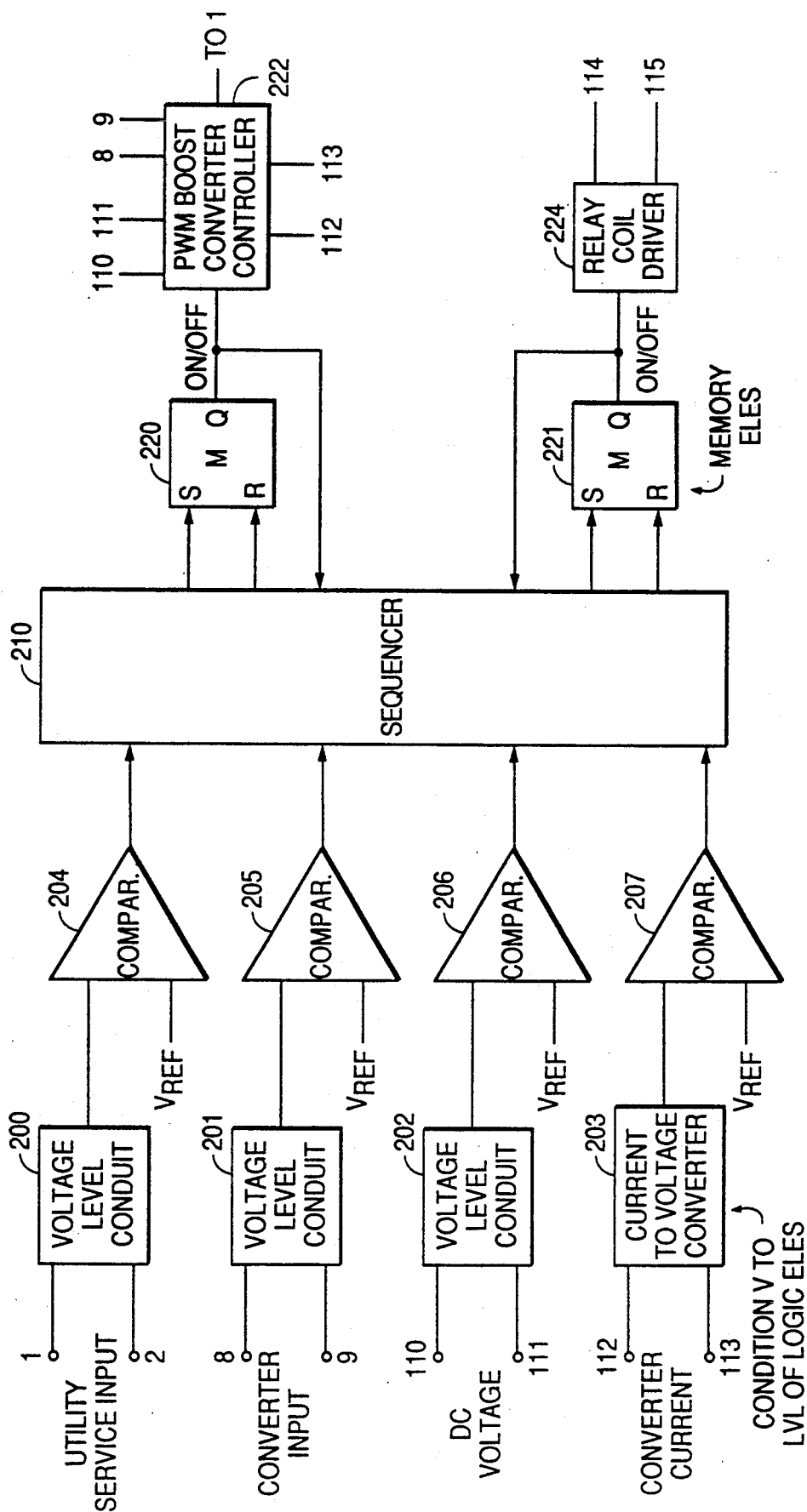
FIG. 3 shows the transfer control circuit between AC and DC on the input of the present invention.

When the utility service voltage gets outside of the predefined limits, the transfer control circuit in FIG. 3 turns on relay 30, and, thereby, disconnects utility service from boost converter 25 and connects converter 25 to battery 3. The battery voltage is preferably smaller than the voltage on capacitor 18 for controlled operation. Because boost converter 25 is between battery 3 and capacitor 18, the battery voltage can be much smaller than the capacitor voltage. A low voltage battery may then be selected to minimize cost. The polarity of battery 3 voltage is immaterial, because bipolar boost converter 25 may use either positive or negative polarity voltage at its input.

Relay 30 is also able to disconnect the utility service to allow for safe operation when servicing.

The transfer time of relay 30 and the amount of electrical energy stored in capacitor 18 are coordinated so that when no power is supplied to capacitor 18 during transfer time, it has enough stored charge that voltage changes only slightly, preferably within 5% of its regulated value. It is important to note that when utility service voltage fails, current through the contacts of relay 30 stops flowing. Therefore, relay 30 does not switch current. This allows use of a much smaller, and therefore faster relay. A fast relay, in turn, reduces the amount of energy required to be stored in capacitor 18 during transfer, and therefore, a much smaller size capacitor can be used.

DC to AC inverter 19, with all of its control circuits, gets DC power from capacitor 18 and converts it to AC power fed to the load. The amplitude of the voltage on the inverter output is usually equal to the nominal voltage in the electric utility which is smaller than the maximum normal utility service volage and is, therefore, smaller than the regulated voltage on capacitor 18. This difference can be 20% of more. This means that the inverter can regulate the output voltage amplitude to a constant value when the capacitor voltage changes are smaller than that difference of 20% of more.

During the transfer time, when the voltage change on capacitor 18 is smaller than the regulation range of inverter 19, there is no change in the output voltage parameters.

When utility power is restored and the voltage is again inside the predefined range, the reverse transfer takes place. The transfer control logic detects that utility power is restored and transfers relay 30 from battery 3 to the utility service. The voltage on capacitor 18 is likewise affected, but there is no effect on inverter 19 output voltage.

Another advantage of this circuit is that battery 3 can be placed remotely from the UPS. Furthermore, since battery 3 is located at the input, all electromagnetic interference filters usually present on UPS input to make it comply with regulatory requirements will also protect the battery connection wiring.

A further advantage of this circuit is that in the normal position where relay 30 contacts are connected to the utility service, battery 3 is safe from discharge.

To charge battery 3 back up, a typical charger may be used, not shown in the figures. Numerous chargers may be employed both within this UPS or outside of it depending on the size of the battery and the required speed of recharging. Battery charges are well known to those in the art.

In steady state operation, when the voltage on terminal 8 is larger than the voltage on terminal 9, i.e., positive polarity, current is flowing through chokes 11-12 and diodes 14 and 17 to charge capacitor 18. Because the voltage on capacitor 18 is larger than the voltage on input terminals 8 and 9, current through chokes 11-12 is decreasing. When switch 13 is turned on by the PWM signal from PWM controller 222, it shorts voltage source on terminals 8 and 9 via chokes 11 and 12. Current starts increasing through chokes 11-12. When switch 13 is turned off by the controller 222, this current is diverted again to charge capacitor 18 via the same diodes 14 and 17.

Substantially identical operation occurs when voltage on terminal 8 is smaller than on terminal 9, i.e., negative polarity. In this case, diodes 15 and 16 conduct the current.

By controlling the duty cycle of switch 13, it is possible to regulate, via controller 222, the voltage on capacitor 18 when the voltage on terminals 8 and 9 varies widely between positive and negative values. For good transient response and regulation, current controlled circuits may be used in the controller of FIG. 3. Moreover, if the current controlled circuits use a sine wave volage as the reference voltage which is phase locked to the utility service voltage, it is then possible to draw sine waveform current from the utility service.

The periodicity, or switching frequency of the PWM signal to switch 13 is preferably much higher than the power line frequency, usually 10-1000 times. Filter capacitor 23 shunts all current fluctuations at this switching frequency occurring due to the action of switch 13, periodically charging and discharging chokes 11 and 12.

When relay 30 transfers converter input to the DC source, i.e., battery 3, boost converter 25 will amplify this voltage to the regulated value of the voltage on capacitor 18, similar to the utility service voltage operation previously described.

Inverter 19 inverts a DC voltage on capacitor 18 into an AC voltage on its output. The amplitude and waveform of this voltage is internally controlled. Inverter 19 controls the amplitude to be close to the nominal value for which the utility service is rated, the same frequency as utility service, and, if desired, the same phase. The peak output voltage is smaller than the voltage on capacitor 18 by 20% or more. Then, when capacitor 18 voltage varies due to regulation, transient, or relay transfer action within this band of 20%, inverter 19 is capable of regulating those changes out, so that the output voltage is unaffected.

Power MOSFET devices contain so called "body diodes." These diodes 403 and 404 are depicted in FIG. 2 with respect to transistors 401 and 402, respectively.

When a high logic level is applied to the gate of both transistors, both conduct and current flows in any direction, from one drain to another or vice versa. If the voltage drop across any transistor having a positive polarity on the source terminal approaches the diodes' knee voltage, then this diode picks up any further current increase and thereby reduces the total power dissipation in switch 13.

Comparator 204 changes its output logic level when the utility service voltage input is outside of a predefined limit at any time during the AC cycle. This is an indication of utility power failure.

Comparator 205 changes its output logic level when converter input voltage on terminals 8 and 9 is above some predefined value relatively small in comparison with nominal amplitude of utility service voltage, preferably 5-10% of it. This signal indicates that the relay contacts are closed and power is available, either utility service or from battery 3.

Comparator 206 changes its output logic level when the voltage on capacitor 18 falls below a predefined value, preferably 5% below its regulated steady state value.

Comparator 207 changes its output logic level when current through the relay contacts falls below some predefined value, preferably below 5% of nominal value under steady state condition.

Outputs of the sequencer are set and reset signals setting memory cells 220 and 221.

Figure 4:
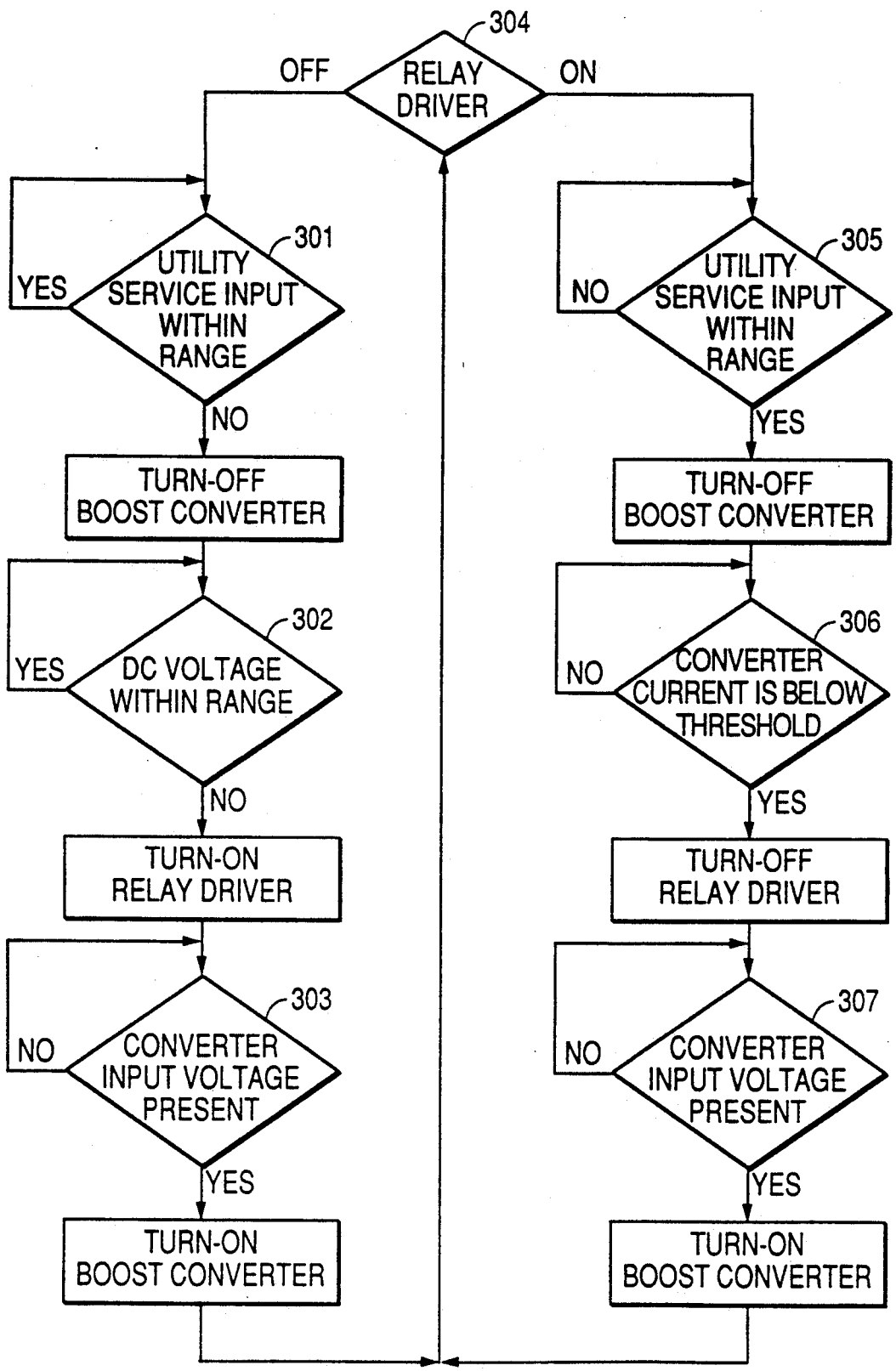
FIG. 4 shows a logic flow-chart for the present invention.

Numerous discrete logic circuits or microprocessor based circuits can perform the function of sequencer 210, as further explained below with reference to FIG. 4.

First, the case when relay 30 driver is in the "OFF" state will be discussed. OFF means that the relay is connected to the utility power.

In the initial state, relay driver is "OFF", boost converter 25 is "ON" utility service voltage is within a predetermined range. The regulated voltage on capacitor 18 and threshold voltage are selected in such a way that amplitude of the voltage dip on capacitor 18 is within regulation range of inverter 19. Sequencer 210 monitors comparator 204's output for the state of utility service. If it is within the predefined range, then initial state is maintained; see branch "YES" on decision block 301. If the voltage is out of range, then sequencer 210 first turns off boost converter 25 by setting memory cell 220; see branch "NO" on decision block 301.

After turning off converter 25, sequencer 210 monitors comparator 202 output. If voltage on capacitor 18 is above the predefined threshold value, then converter 25 is maintained in the "OFF" state, branch "YES" on decision block 302.

When voltage on capacitor 18 reaches the threshold value, then sequencer 210 turns on relay driver 224 by setting memory cell 221.

Then, sequencer 210 monitors comparator 201's output. When relay 30's contacts connect battery 3 to converter 25, comparator 201 indicates that the voltage is present; see branch "YES" on decision block 303. Then sequencer 210 turns on boost converter 25 by resetting memory cell 220. After this, sequencer control is diverted via relay position block 304 to decision block 305 as at this stage, the relay is positioned on the battery.

Again, sequencer 210 monitors output of comparator 200 in block 305. If utility voltage is not restored within its predefined range, then operation continues; see "NO" branch on decision block 305. In this case, boost converter 25 discharges battery 3 and regulates voltage on capacitor 18.

When utility voltage is restored, sequencer 210 first turns off boost converter 25 by resetting its memory cell 220; see branch "YES" on decision block 305. Then sequencer 210 starts monitoring converter current comparator 207. Until current is above its predefined value, no action is taken; see branch "NO" on decision block 306.

When current is below a predetermined threshold value, sequencer 210 turns off relay driver 30 by resetting its memory cell 221; see branch "YES" on decision block 301. Now sequencer 210 starts monitoring converter input voltage via comparator 205. Until a voltage appears, there is no action; see branch "NO" on decision block 307.

When relay (30's) contacts become connected to the utility service and voltage appears on the converter input, sequencer 210 turns on boost converter 25 by setting its memory cell 220; see branch "Yes" on decision block 307. Then sequencer 210 transfers control to decision block 301 via relay position block 304 back to the beginning of the above-described sequence.

Figure 5:
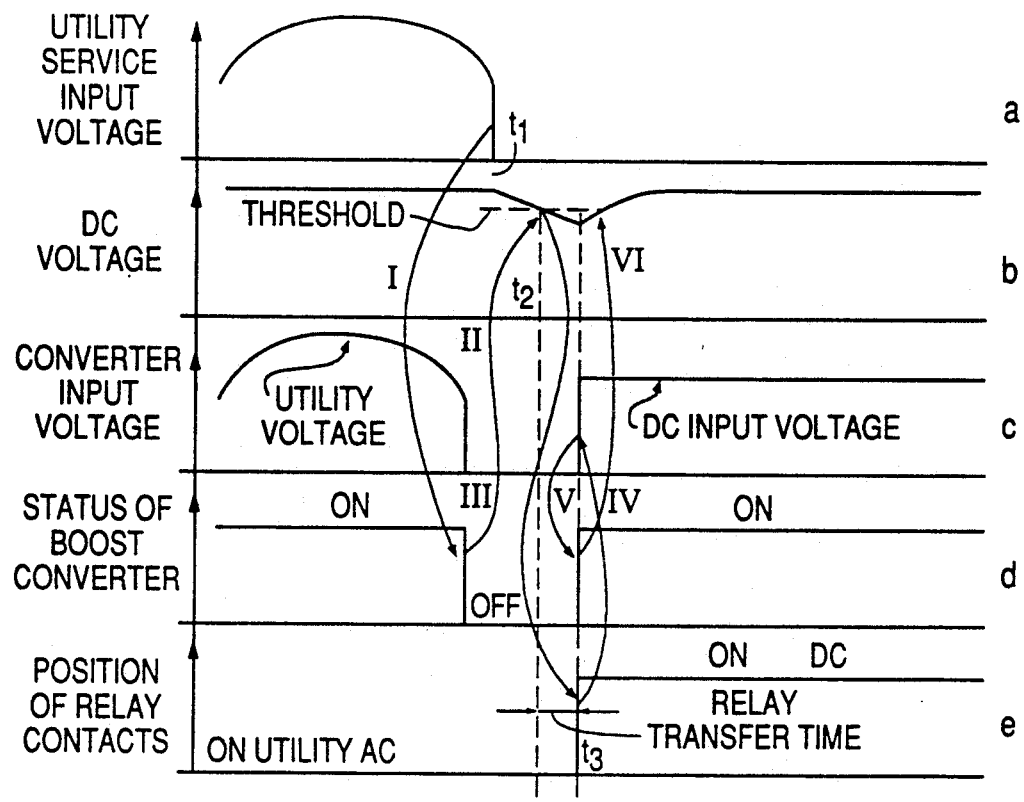
FIGS. 5a-e show diagrams of signals affecting transfer from AC to DC power for the present invention.

FIG. 5 depicts five signals a-e explaining transfer of power from AC to DC under the present invention.

FIG. 5a shows positive polarity portion of utility voltage until time t1 when input power fails and utility voltage disappears.

At t1, voltage on capacitor 18 starts decaying, FIG. 5b.

At $t_1$, step I, sequencer 210 turns off boost converter 25, FIG. 5d.

Then at time t2, step II, DC voltage on capacitor 18 reaches a predefined threshold value, see FIG. 5b. At this time ($t_2$), sequencer 210 turns on relay 30.

In step III, after the transfer time of relay 30 (i.e., $t_3-t_2$), at time t3 on FIG. 5e, DC voltage appears on the converter input instead of the failed utility service voltage, FIG. 5c. That is, in step IV, relay 30 has switched to contacts 4 and 5 to thus provide a DC voltage at the converter input from battery 3. See FIG. 5c. Thereafter, in step V, sequencer 210 turns boost converter 25 back on, FIG. 5d. Finally, in step VI, voltage on capacitor 18 returns back into the regulation range, above the threshold. See FIG. 5b.

Figure 6:
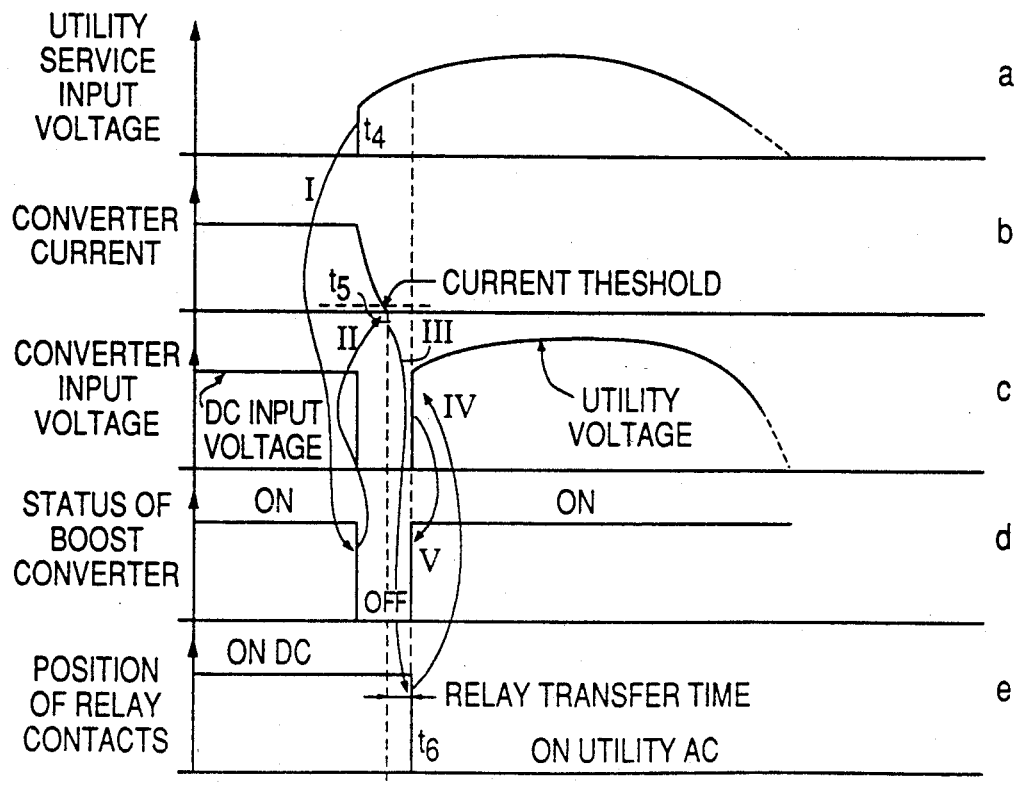
FIGS. 6a-e show diagrams of signals affecting transfer from DC to AC power for the present invention.

FIG. 6 depicts diagrams of five signals a-e explaining transfer of power from DC to AC under the present invention.

FIG. 6a shows how at some point of time $t_4$, utility service voltage is restored (positive polarity is shown).

During step I, sequencer 210 turns off boost converter 25 at time $t_4$, FIG. 6d, and converter current previously flowing through chokes 11 and 12 starts falling, step II. At time $t_5$, current falls below the predetermined threshold value, FIG. 6b, and sequencer 210 turns off relay 30, step III. After the relay transfer time ($t_6-t_5$), relay 30 connects the utility service to converter 210 at time $t_6$ on FIG. 6e.

At t6, converter input voltage appears again, FIG. 6c and step IV, and sequencer 210 turns on boost converter again, FIG. 6d, step V. Operation of the UPS returns to its normal operation with power inputted from the utility service.

While the present invention has been disclosed with respect to a preferred embodiment and modifications thereto, further modification will be apparent to those ordinarily skilled in the art within the scope of the claims that follow. Therefore, it is not intended that the invention be limited by the disclosure, but instead that its scope be determined entirely by reference to the claims which follow.

I claim:

1. An uninterruptible power supply, said power supply comprising:

AC input terminal means for receiving a first AC voltage from an AC power source;

DC input terminal means for receiving a first DC voltage from a DC power source;

AC output terminal means for connecting to a load;

converter means for converting said first AC voltage to a second DC voltage across electrical charge storage means coupled to said converter means, said second DC voltage being larger than the maximum peak voltage of said first AC voltage and said first DC voltage;

switching means coupled to said AC power source and said DC power source for selectively connecting said AC power source or said DC power source to said converter means;

inverter means coupled to said electrical charge storage means for receiving said second DC voltage and inverting said second DC voltage to a second AC voltage, said second AC voltage being coupled to said AC output terminal means; and control means coupled to said switching means for controlling the operation of said switching means, said control means operating said switching means to connect said AC power source to said converter means only when said first AC voltage is within a predetermined range and operating to connect said DC power source to said converter means when said first AC voltage is outside of said range.

2. A power supply in accordance with claim 1, wherein said control means further controls the operation of said switching means to connect said AC power source or said DC power source to said converter means only when electric current is not being supplied by said power sources to said converter means.

3. A power supply in accordance with claim 2, wherein said power supply further includes current measuring means coupled to said AC power source and said DC power source for measuring the level of current drawn from said AC power source or said DC power source.

4. A power supply in accordance with claim 3, further including AC voltage level conditioning means coupled to said AC input terminal means for providing a conditioned AC voltage level signal, converter input voltage level conditioning means coupled to the input of said converter means for providing a conditioned converter input voltage level signal, DC voltage level conditioning means coupled to said electrical charge storage means for providing a conditioned DC voltage level signal, and converter current conditioning means coupled to said current measuring means for providing a conditioned converter current level signal, said conditioned AC voltage level signal, said conditioned converter input voltage level signal, said conditioned DC voltage level signal and said conditioned converter current level signal being used to control the operation of said switching means.

5. A power supply in accordance with claim 4, wherein said control means includes AC voltage level comparator means for comparing the level of said conditioned AC voltage level signal to a first reference voltage and providing a logic signal identifying that said AC voltage is within a desired range, converter input voltage comparator means for comparing the level of said conditioned input voltage level signal to a second reference voltage and providing a logic signal identifying that said converter input voltage is above a desired level, DC voltage comparator means for comparing said conditioned DC voltage level signal to a third reference voltage and providing a logic signal identifying that said DC voltage is below a desired level, and converter current comparing means for comparing said conditioned converter current level signal to a reference current signal and providing a logic signal identifying that said current is below a desired level, said logic signals being used to control the operation of said switching means.

6. A power supply in accordance with claim 5, wherein said control means includes on-off input means for controlling the operation of said converter means.

7. A power supply in accordance with claim 5, wherein said control means includes on-off input means for controlling the operation of said switching means.

8. A power supply in accordance with claim 5, wherein said control means includes memory means for storing information associated with the operating state of said converter means and switching means, said memory means having respective outputs connected to said on-off input means for said converter control means and said on-off input means for said switching means.

9. A power supply in accordance with claim 8, wherein said memory elements have set and reset inputs.

10. A power supply in accordance with claim 9, wherein said control means further includes logic means for receiving said AC voltage level signal, said converter input voltage level signal, said DC voltage level signal and said outputs from said memory means, said logic means responding to said signals to provide control signals for said set and reset inputs of said memory means.

* * * * *